(12) United States Patent
Kiss et al.

(10) Patent No.: US 7,269,556 B2
(45) Date of Patent: Sep. 11, 2007

(54) PATTERN RECOGNITION

(75) Inventors: Imre Kiss, Tampere (FI); Marcel Vasilache, Tampere (FI)

(73) Assignee: Nokia Corporation, Espoo (FI)

( * ) Notice: Subject to any disclaimer, the term of this patent is extended or adjusted under 35 U.S.C. 154(b) by 884 days.

(21) Appl. No.: 10/402,367

(22) Filed: Mar. 26, 2003

(65) Prior Publication Data

US 2004/0039572 A1 Feb. 26, 2004

(51) Int. Cl.
*G01L 15/06* (2006.01)

(52) U.S. Cl. ............... 704/245; 704/233; 704/256; 704/240

(58) Field of Classification Search ........ 704/226–233, 704/256, 240–245
See application file for complete search history.

(56) References Cited

U.S. PATENT DOCUMENTS

| | | | | |
|---|---|---|---|---|
| 5,465,308 A | * | 11/1995 | Hutcheson et al. | 382/159 |
| 5,590,242 A | * | 12/1996 | Juang et al. | 704/245 |
| 5,751,905 A | * | 5/1998 | Chen et al. | 704/254 |
| 6,009,199 A | | 12/1999 | Ho et al. | 382/224 |
| 6,009,390 A | | 12/1999 | Gupta et al. | 704/240 |
| 6,098,040 A | * | 8/2000 | Petroni et al. | 704/234 |
| 6,178,401 B1 | | 1/2001 | Franz et al. | 704/255 |
| 6,405,168 B1 | | 6/2002 | Bayya et al. | 704/256 |

FOREIGN PATENT DOCUMENTS

EP 0125422 11/1984

WO EP 0 125 422 A1 * 3/1984

OTHER PUBLICATIONS

"Should Recognizers Have Ears?", H. Hermansky, *Speech Communications* vol. 25 (1998), pp. 3-27.
"Dimensionality Reduction Using Genetic Algorithms", M. Raymer et al, *IEEE Transactions on Evolutionary Computation*, vol. 4, No. 2, Jul. 2000, pp. 164-171.
"Speech Recognition Complexity Reduction Using Decimation of Cepstral Timie Trajectories", J. Iso-Sipila, from internet. Eupisco pp. 1297-1300, Sep. 2000.

* cited by examiner

*Primary Examiner*—Vijay B. Chawan
(74) *Attorney, Agent, or Firm*—Ware, Fressola, Van Der Sluys & Adolphson LLP (57) ABSTRACT

Pattern recognition, wherein a sequence of feature vectors is formed from a digitized incoming signal, the feature vectors comprising feature vector components, and at least one feature vector is compared with templates of candidate patterns by computing a distortion measure. A control signal based on at least one time-dependent variable of the recognition process is formulated, and the distortion measure is computed using only a subset of the vector components of the feature vector, the subset being chosen in accordance with said control signal. This reduces the computational complexity of the computation, as the dimensionality of the vectors involved in the computation is effectively reduced. Although such a dimension reduction decreases the computational need, it has been found not to significantly impair the classification performance.

23 Claims, 4 Drawing Sheets

PATTERN RECOGNITION

CROSS-REFERENCE TO RELATED APPLICATION

This application claims priority under 35 USC §119 to International Application Number PCT/IB02/00954, filed 27 Mar. 2002.

BACKGROUND OF THE INVENTION

1. Field of the Invention

The present invention relates to pattern recognition, where a set of feature vectors is formed from digitized incoming signals, and compared with templates of candidate patterns.

2. Related Art

In pattern recognition, incoming signals are digitized, and a sequence of feature vectors are formed. These feature vectors are then compared to templates of the candidate patterns, e.g., sounds or images to be identified in the signal. In the case of speech recognition, the candidate patterns can represent e.g., names in a phonebook.

However, pattern recognition such as speech recognition is computationally demanding. In many cases, for example when implemented in embedded devices, due to the limited amount of memory and computational power there is a need to reduce the complexity of the pattern recognition algorithm.

The computational complexity depends on several factors: the sampling rate, the number of candidate model templates, and the feature vector dimension. Reducing any of these results in faster recognition that can be run in reasonable time on a certain processor, but this can result in poorer recognition accuracy.

Furthermore, available resources are usually shared between different processes, and the available processing power and memory capacity is therefore variable. If the recognition functionality of an embedded device, having limited processing capacity to begin with, is to work at all times, it is even more crucial to minimize or dynamically adjust the processing requirements, without losing recognition accuracy.

Conventional complexity reduction of pattern recognizers has been addressed by at least the following prior art techniques:

1. Feature Vector Down-sampling

A technique that reduces the decoding complexity by using the state likelihood (SL) measure corresponding to an incoming feature vector in several consecutive frames (time instants).

2. Clustering of the Model Templates

This technique clusters the acoustic space off-line. During decoding, a quick search among the clusters is performed first, and then only the SL measures for the members of the best matching cluster are evaluated.

3. Lowering the Feature Vector Dimension

The number of feature vector components are reduced to a predefined number, using advanced linear transforms, such as PCA, LDA, etc, or neural networks.

Focusing on the third category, conventional examples of this technique do not have the flexibility to scale the computational complexity according to the available CPU power. Instead, it is always considered with the worst-case scenario. In addition, spectro-temporal linear transforms or neural network-based mappings may significantly increase the complexity of the front-end, and thus the whole recognizer.

An example of feature vector dimension reduction is given in "Should recognizers have ears", Speech Communication, Vol. 25, pp. 3-27, 1998.

DISCLOSURE OF INVENTION

An objective of the present invention is to solve or mitigate the above problems.

According to a first aspect of the invention, this objective is achieved by a method of the kind mentioned by way of introduction, further comprising formulating a control signal based on at least one time-dependent variable of the recognition process, and, for said at least one feature vector, computing only a subset of said distortion measure contributions using the vector components of said at least one feature vector, said subset being chosen in accordance with said control signal.

It should be emphasized that the expression "only a subset" indicates a number less than the number of distortion measure contributions available. In other words, the subset includes less contributions than are defined in the comparison of the feature vector and the templates. This reduces the computational complexity of the computation, as the dimensionality of the vectors involved in the computation is effectively reduced. Although such a dimension reduction decreases the computational need, it has been found not to significantly impair the performance or noise robustness of the speech recognizer.

More specifically, the solution according to the invention can reduce the complexity of the calculations by reducing the number of operations in the computation of the state likelihood, e.g. b-probability, that is a dominant factor in the computation process.

Further, the solution according to the invention does not need extensive amounts of memory. In fact, an embodiment of the invention may even operate without any additional memory depending on the actual implementation.

According to one embodiment, the control signal is indicative of the processor load. The reduction of complexity is thus adjusted according to the instantaneous processor capacity. This is a potential advantage of the present invention. The control signal can alternatively be indicative of incoming signal properties.

The inventive concept can be viewed as masking some components of the feature vector itself, as it is the feature vectors that contain the information to be recognized. With this terminology, the method can comprise a masking process, where some components of each feature vector are masked, by applying a mask. The mask can omit selected components of the vectors, resulting in a reduced number of computed distortion measure contributions.

The component mask can be selected from a set of predefined masks, including at least one non-null mask, in accordance with said control signal. This results in an implementation requiring very little additional processing capacity to handle the masks.

Alternatively, the mask is dynamically computed in accordance with the control signal in each specific instance, resulting in a slightly more memory efficient implementation. Also, this implementation is more flexible, as the masks can be computed to match changing processing needs.

In other words, a set of masks is available, either by being stored in the memory of a pattern recognition device or by creating the masks dynamically, when necessary. Depending on the control signal, a mask from this set of masks is used to reduce the number of computed distortion measure contributions. As using different masks results in different computational complexity, the speech recognition process can adapt to e.g., varying processor capacity, while still maintaining good recognition accuracy in low-load situations (and instants). Switching between masks can be performed even at a very high temporal resolution (e.g. frame-by-frame, every 10 ms). Therefore, it provides the maximum performance when the CPU is idle, and gives a graceful degradation when other load is present.

If deemed advantageous, the mask may, at given intervals, mask all components in the feature vector, i.e., eliminating the entire distortion measure relating to this feature vector, and thereby causing a decimation of the sequence of feature vectors. This offers the possibility to combine selective reduction of vector dimension with time-domain complexity reduction techniques, such as feature vector down-sampling.

According to one embodiment, specific vector components of successive feature vectors are used with a rate depending on their temporal characteristics. This makes it possible to achieve a feature component specific down-sampling, where feature components that, e.g., vary slowly in time can be down-sampled more than feature components varying rapidly in time. Such down-sampling schemes can be implemented by properly adjusting the process of calculating and/or dynamically selecting the mask.

According to yet another embodiment, the subset of distortion measure contributions is combined with contributions from a previously computed distortion measure. In other words, contributions from masked components that were skipped in the computation, are replaced by the contributions from the most recently performed calculation of corresponding components.

This means that a non-computed contribution is approximated with the most recently calculated, corresponding contribution, improving the performance without significantly increasing computational cost. Also, this technique ensures that all distortion measures are calculated based on vectors of the same dimension. This simplifies future processing, e.g., eliminates the need of scaling when comparing distortion measures and the need of recalculating any constants dependent upon the number of contributions.

The invention can preferably be implemented in a speech recognition process, in which case the signal represents speech and the pattern represents spoken words. The invention can advantageously be used in speech recognition systems implemented in embedded devices, such as mobile phones. Further, the templates can be Gaussian mixture densities of hidden Markov models (HMM).

According to a second aspect of the invention, the above objective is achieved with a device for pattern recognition, comprising means for forming a sequence of feature vectors from a digitized incoming signal, means for formulating a control signal based on at least one time-dependent variable of the recognition process, and means for comparing at least one feature vector with templates of candidate patterns by computing a distortion measure comprising distortion measure contributions wherein the comparing means are arranged to compute only a subset of the distortion measure contributions, the subset being chosen in accordance with said control signal.

BRIEF DESCRIPTION OF THE DRAWINGS

These and other aspects of the invention will be apparent from the preferred embodiments more clearly described with reference to the appended drawings.

DETAILED DESCRIPTION OF PREFERRED EMBODIMENTS

In the following description, the pattern recognizing process is a speech recognition process, used in e.g. voice based user interfaces. However, this should not be regarded as a limitation to the invention, which is directed to pattern recognition in general. The incoming signals may be any digitized signals, and the candidate patterns may represent sounds, images, texts, handwritten characters, etc.

Figure 1:
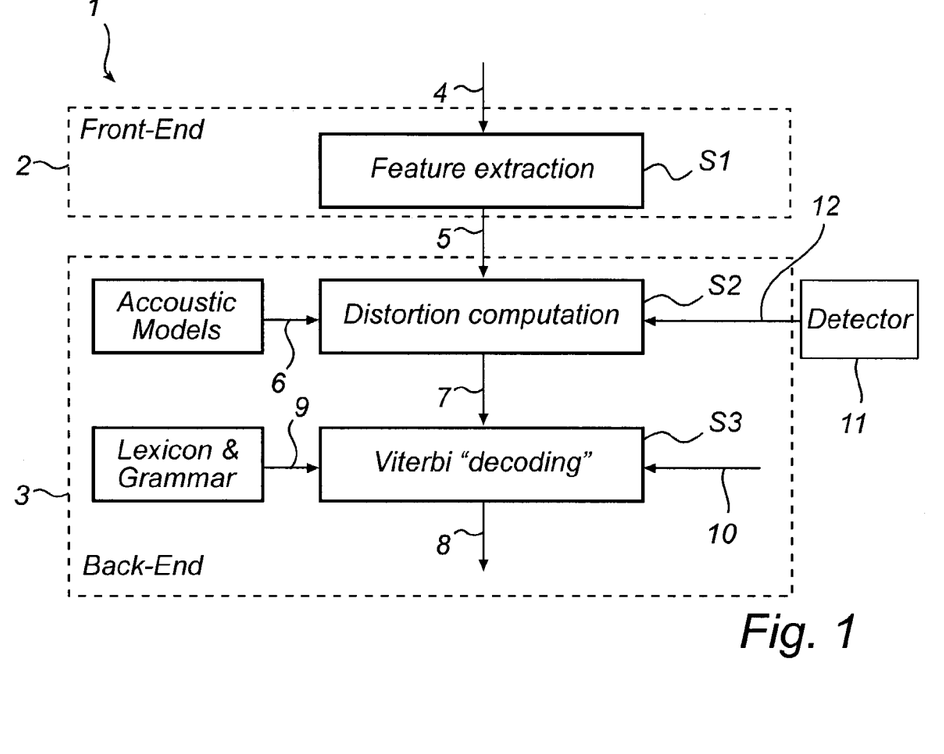
FIG. 1 illustrates the block diagram of a speech recognition engine

A speech recognizer 1 as illustrated in FIG. 1 typically comprises a front-end processing section 2, responsible for the feature extraction, and a back-end processing section 3, responsible for the statistical analysis of extracted features with respect to model templates of candidate words or parts of words. These models can be created by on-line training (speaker-dependent name dialing, SDND) or by off-line training (speaker-independent name dialing, SIND).

The input to a speech recognizer 1 consists of a digitally sampled waveform 4 split into consecutive, possibly overlapping segments. For each segment three main processing steps are performed:

S1. Feature extraction, producing a vector of features 5.

S2. Computation of the distortion values for the current feature vector compared to the acoustic model templates 6 (in the example below referred to as Guassian densities), resulting in a distortion table 7 (in the example below referred to as a b-probability table).

S3. Viterbi "decoding", i.e., the current best cumulative distortion values 8 are obtained based on the distortion table computed in step S2 and the best cumulative distortion values for the previous speech segment 10. The allowed transitions are constrained by the recognition lexicon plus grammar 9.

When the speech input ends, the current best recognition hypothesis, as found by the Viterbi decoding step, is typically presented to the user as the recognition result.

Each acoustic model is usually represented by a hidden Markov model (HMM). The HMMs are the building blocks for the possible classification outcomes.

The HMM is a statistical automaton, which can accept/generate feature vectors. It consists of a set of states, and a set of allowed transitions between these states. Each transition has an associated probability value. Each state is described by a probability density function (PDF) on the space of feature vectors. The negative log-likelihood given by the state PDF and the feature vector can be also viewed as a distortion measure. Given the current state of the automaton it accepts/generates the current feature vector according to the likelihood given by the current state's PDF and then makes a transition to a new state as constrained by the set of transition probabilities.

The HMM that, during time, results in the smallest aggregate distortion is selected as the recognition result.

One of the most demanding computations consists of evaluating, for every feature vector, the distortion to the states of the recognition models. As mentioned before, this distortion is normally computed as a state likelihood measure, (its value also referred to as "b-probability").

In a typical recognition engine, the PDF of each state is a mixture of a certain number of Gaussian densities (e.g., 8). Each density contains a mean and an inverse standard deviation parameter vector.

During recognition, every incoming feature vector is first matched against the parameters (mean and standard deviation) of each density, to generate a distortion measure based on the log-likelihood value as follows, $$L = C - \sum_{i=1}^{D}(x_i - \mu_i)^2 \cdot istd_i^2, \quad (1)$$

where L is the log-likelihood of the density, $x_i$ is the $i^{th}$ vector component of the feature vector, $\mu_i$ and $istd_i$ denote the $i^{th}$ mean and inverse standard deviation vector component, D represents the number of feature components (the feature vector dimension), and C is an additive constant equal to the logarithm of the product of inverse standard deviations times 1/sqrt(2*pi) to the power of D, where D is the feature vector dimension.

The state b-probability is then given as follows $$b = \log \sum_{i=1}^{M} \exp(W_i + L_i) \quad (2)$$

where $W_i$ and $L_i$ are, respectively, the log-mixture weight and the log-likelihood for density i, M stands for the number of densities in the state and b is the b-probability value.

After calculating the b-probability values for all the states, the results are stored in a so called b-probability table, needed by the Viterbi algorithm. This algorithm is used to determine a sequence of HMMs which best matches, in the maximum likelihood sense, the stream of input feature vectors. The algorithm is implemented using a dynamic programming methodology.

The number of multiplications and additions required to compute the b-probability table can be approximated as follows:

multiplications=#all densities*#feature components*2, additions=#multiplications.

Figure 2A:
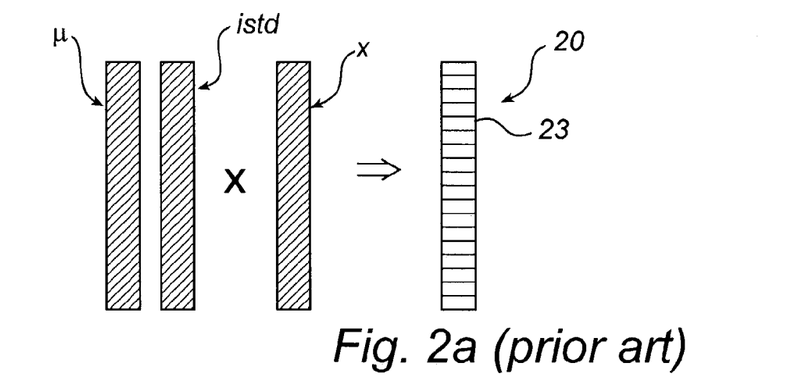
FIG. 2a illustrates schematically computation of a distortion measure according to prior art.

The computation of the log-likelihood is illustrated in FIG. 2a. A density 6, comprising two vectors (μ and istd) of dimension N, and a feature vector 5, comprising one vector (x) of dimension N, are multiplied according to eq. 1 to form a set 20 of N log-likelihood terms 23, which are then summed according to eq. 1 to generate the value L.

Figure 2B:
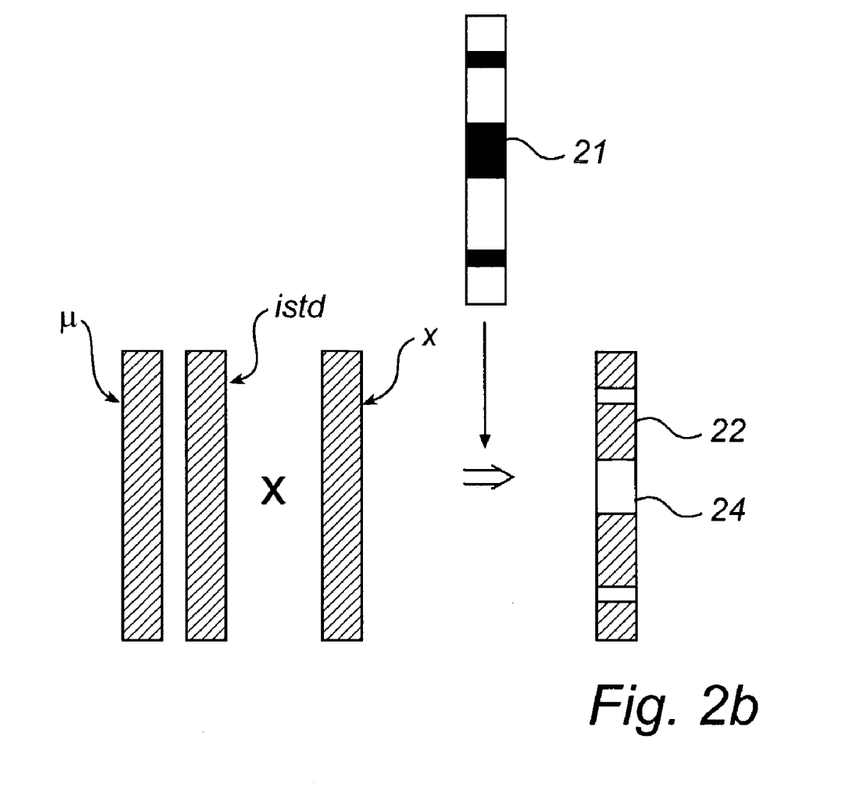
FIG. 2b illustrates schematically computation of a distortion measure according to an embodiment of the invention.

According to the invention, the number of required operations is reduced by masking some of the vector components, so that they are not taken into account in eq. 1. The complexity reduction will be approximately proportional to the relative number of masked components. This is illustrated in FIG. 2b. In this case, a mask 21 is allowed to reduce the number of computed distortion measure contributions 23. The black sections of the mask 21 indicate terms 23 in eq. 1 that are not computed. As a result, some terms 24 of the set 20 are masked, and only the remaining terms 22 are computed and summed to generate the log-likelihood value L. Note that the vectors (μ, istd, x) and sets (20) in FIGS. 2a and 2b are schematic, and that each marked section in reality can comprise several components or terms.

Figure 4:
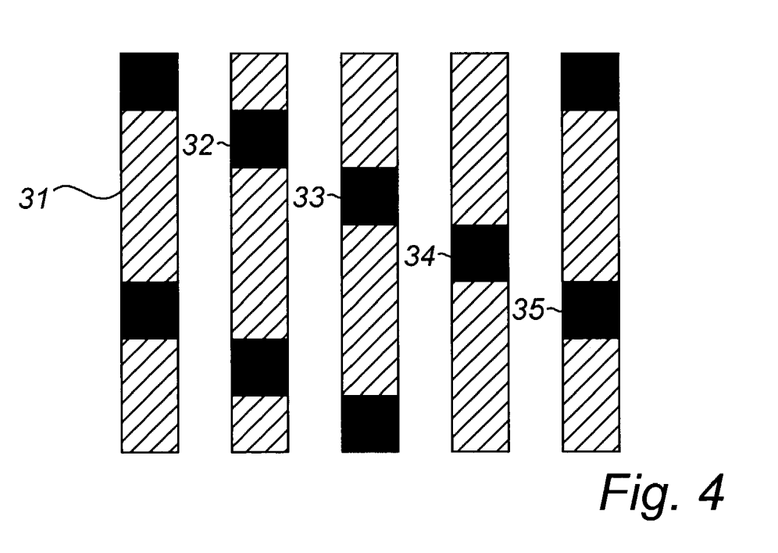
FIG. 4 illustrates a masking process according to a further embodiment of the invention.

Although the masking as described above relates to the log-likelihood terms 23, the masking process can also be viewed as if the feature vector, x, and the density vectors, μ and istd, were reduced, this in turn leading to a reduced number of distortion measure contributions. Some advantages of the invention are more clearly understood when viewed this way, and some examples below, for example FIGS. 4 and 5, actually refer to masking of the feature vectors x.

According to the invention, the masks may vary with time, i.e., different contributions are to be masked in different frames. The variations can be based on, e.g., current processor load or properties of the input signal. For this purpose, the recognizer 1 in FIG. 1 can be provided with (or connected to) a detector 11 of such load or properties, arranged to generate a control signal 12 used in the distortion computation S2.

Figure 2C:
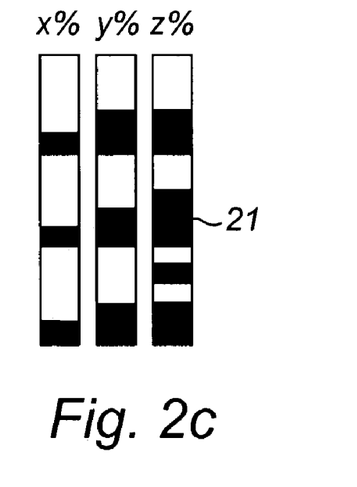
FIG. 2c illustrates different masks suitable for the computation in FIG. 2b.

FIG. 2c shows three different masks 21 that can be applied to the computation in FIG. 2b. Each mask 21 has a different scope, i.e., able to reduce the number of distortion measure contributions 23 by a different factor, x, y and z respectively.

Figure 2D:
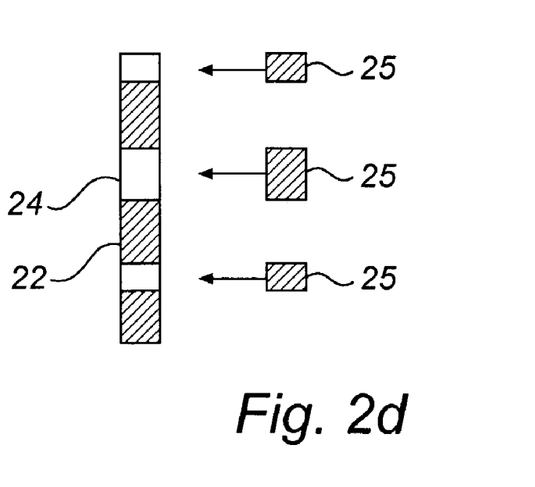
FIG. 2d illustrates schematically computation of a distortion measure according to a second embodiment of the invention.

In some cases it may be advantageous to preserve the number of components or terms in the log-likelihood computation (eq. 1). The masked terms 24 can then be replaced by corresponding, previously computed terms 25, as illustrated in FIG. 2d.

A flow chart of the masking process implemented in a recognition process as described above, is illustrated in FIG. 3. The flow chart relates to the handling of one feature vector.

Figure 3:
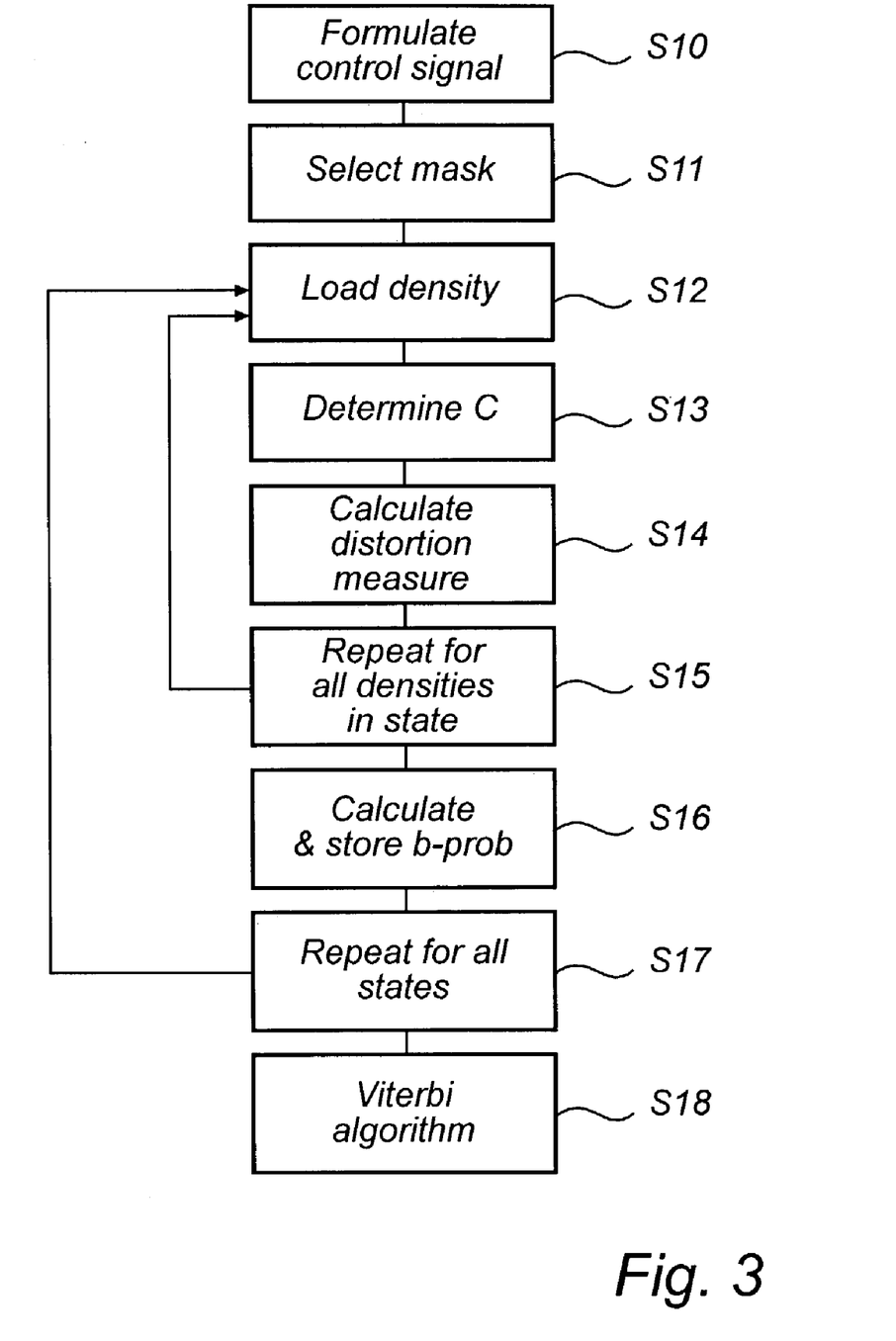
FIG. 3 is a schematic flow chart of the masking process according to an embodiment of the invention.

First, in step S10, a control signal is formulated. As mentioned, this control signal can be indicative of the processor load, or any other time dependent variable of the recognizing process. Then, in step S11, an appropriate mask 21 is selected. The feature masks can be pre-computed for certain pre-defined complexity levels (e.g., masking factors x, y, z) and they can even be hard coded into the front-end 3 software to minimize the computational overhead. Alternatively, the recognizer 1 is provided with software adapted to calculate a suitable mask for each instance, or at least at regular intervals. Such software can be implemented in the front-end 2, and/or in the back-end 3.

An advantage with computing the masks dynamically is that the masking process then is more adaptive to varying conditions. The number and scope of the optimal masking factors may change depending on application, type of recognition, environment, etc.

Note that step S11 can make the mask selection for each feature vector individually, or take several feature vectors into account in a more elaborate feature vector reduction. Examples of such more elaborate schemes are given in the following description.

In step S12, a set of density vectors is loaded from the static memory for comparison with the current feature vector.

As described above, the constant C in Eq. 1 is dependent on the selection of computed log-likelihood terms 23. Therefore, for each particular feature mask a corresponding C value is required for the loaded densities. Such a C value is determined in step S13.

The required C constants can be pre-computed and stored in the memory of the recognizer, so that step S13 is a simple selection from these values. The relative memory increase resulting from this storage can be approximated as:

$$delta = \frac{N}{dim + 1}$$

where delta is the required memory increase, N is the number of masks, and dim is the number of feature vector components. In a practical scenario with three masks, e.g., for complexities of 80%, 60%, and 40%, and with a feature vector dimension of 39, the memory increase would be 3/(39+1)=7.5% of the size of the acoustic models. Alternatively, the C values are not stored, in order to save memory. Instead, they can be re-computed in step S13 every time a density is loaded for processing from the static memory. In such a scenario, feature vector masking can be implemented without any need for extra memory at all.

In step S14, the log-likelihood L according to eq. 1 is calculated. The masking process has the effect to skip some of the terms in the summation in eq. 1, thereby reducing the calculation complexity, as shown in FIG. 2b. The mask is simply a set of rules defining which terms 23 to skip and which terms 22 to compute during the calculation of eq. 1.

The step S14 may also include the completion of the distortion measure contributions as was described above with reference to FIG. 2d. This can eliminate the need for step S13, as a full scale summation is performed in this case.

After the log-likelihood L has been computed in step S14, step S15 directs program control back to step S12 and loads the next set of density vectors in the state. This is repeated for all densities in the state.

After all densities in a state have been compared to the current feature vector, in step S16 the b-probability (eq. 2) can be calculated and stored in the b-probability table, and step S17 then directs program control back to step S12 and loads the first set of density vectors in the next state. This is repeated for all states.

Finally, in step S18, the Viterbi algorithm is implemented in a manner known per se.

According to one embodiment, the masking can be adapted to include the principle of feature down-sampling, by "masking" the entire vector of selected frames. While feature down-sampling removes time-domain redundancies by decimating the features (e.g., by a factor of 2), feature component masking according to the above description eliminates the least useful feature vector components in every feature sample.

Even for a given masking percentage, it is possible to select the most suitable components to mask at a given moment in time, and these components may vary with time. An example is given in FIG. 4, where five feature vectors, 31-35, are masked in an alternating manner, resulting in a constant masking factor, but with no component being masked more than every fourth frame.

Further, in many pattern recognition applications the feature vectors may be formed by concatenating components extracted from various sources. Due to this based on the cepstral information for each component the components are assigned to the appropriate sub-spaces. The degree of variation can also be known a priori from the front-end design (e.g. multi-resolution front-end, or a front-end combining features of different types).

In the semi-dynamic selection, in addition to the static sub-space separation, the decision to compute or not a given distortion measure for a certain sub-space can also be controlled by using a similarity measure between successive features.

In the dynamic case the sub-space decomposition is done entirely at run time, for pairs or groups of features, with the help of a similarity measure. For every feature component, a one-dimensional similarity measure is computed. The components with the slowest variation (as indicated by the similarity measure) are placed in the slow varying subspace for the given group of features.

Figure 6:
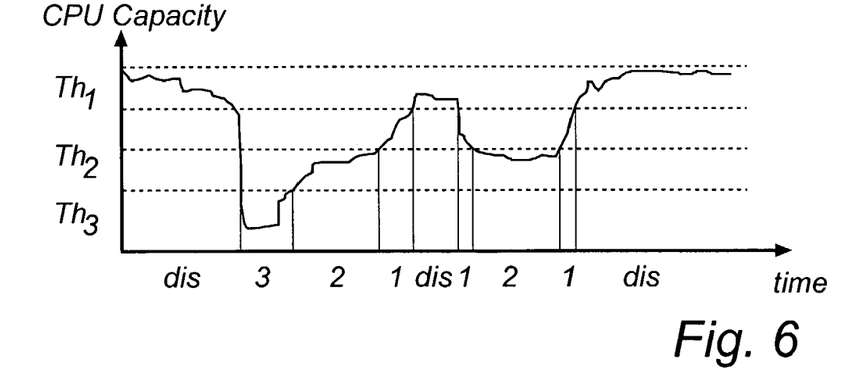
FIG. 6 illustrates the effect of processor load.

FIG. 6 describes how the pre-defined or dynamically, computed feature masks can be selected according to the actual current load of the processor in the recognizer 1. Thresholds Th1, Th2 and Th3 are pre-defined, and when they are reached, the complexity of the probability computation is altered by switching between feature masks 1, 2, or 3, having different masking factors. When not needed, i.e., when processor load does not exceed threshold 1, feature masking can be completely disabled (dis) to provide maximum accuracy. Note that FIG. 6 does not include the load caused by the recognizer engine itself.

The process of mask selection can also be adaptive, so that the actual load resulting from a certain mask selection is used to determine what mask to use. By employing a learning algorithm, the impact of different masks on the CPU load can be registered, in order to improve future mask selections.

According to another embodiment of the invention, the selection of feature vector masks is performed based on input signal properties, e.g., time variation, signal/noise-ratio, etc. The input signal is first analyzed, and a suitable mask is selected in accordance with the determined properties.

Alternatively, the result of the recognition process is analyzed, and the mask selection is performed and adapted based on these results. For a particular mask, it is determined if the recognition results are satisfactory. If not, a less extensive mask is selected. If the masking is satisfactory, the mask is maintained, or even exchanged for a more extensive mask. In other words, the success of recognition is maintained at a desired level, while masking as many vector components as possible.

As apparent to the skilled person, a number of modifications and variations of the above described embodiments are possible within the scope of the appended claims. For example, other types of control signals may be employed, in order to optimize the masking process. Other types of criteria for selecting masks and the scope of the masks can also be envisaged. Also, the described computation of distortion measures can be employed in pattern recognition processes different from the one described herein. Finally, the described methods can equally well be applied with other types of distortion measures as long as they can be formed by using partial distortion values from the component subspaces. the feature vector space is in fact a product of the sub-spaces of the individual sources. For the majority of cases the distortion measure can be factored into several terms by taking advantage of the decomposition of the feature space. Since for the classification algorithm a sequence of feature vectors needs to be processed, in another embodiment of the invention the feature space is first partitioned into two subspaces; one with rapidly varying and another with slowly varying components. Since for each density the distortion is obtained by combining, possibly by weighting, the distortion of the two sub-spaces, the method can effectively reduce the computation by down-sampling the slowly varying components. This corresponds to selecting slightly different masks for different frames, possibly with different masking percentages.

Figure 5:
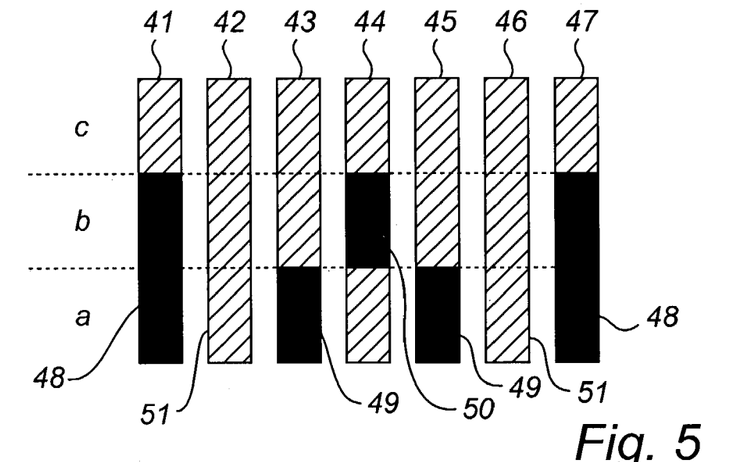
FIG. 5 illustrates a masking process according to a yet another embodiment of the invention.

The number of sub-spaces is not necessarily two. A more refined decomposition can be achieved if the degree of variation is large. As illustrated in FIG. 5, each feature vector 41-47 can be divided into 3 parts a, b, c: a very slowly varying subspace, a, for down-sampling by 2, a slowly varying subspace, b, for down-sampling by 3/2, and a rapidly varying subspace, c, for no down-sampling. This is achieved by masking different components with different periodicity. The b subspace is masked in every third frame, and the a subspace is masked in every second frame. As shown in FIG. 5, this results in three different masks 48-50, applied in combination with a null mask 51 for some frames.

For the selection of the sub-space decomposition and down-sampling rates there are the following alternatives:
1. Static selection
2. Semi-dynamic selection
3. Dynamic selection In the static selection process, the decomposition is done prior to the recognition process, e.g., by analyzing the feature stream. In the simplest approach,

The invention claimed is:

1. A method for pattern recognition, comprising:
forming a sequence of feature vectors from a digitized incoming signal, said feature vectors comprising feature vector components,
comparing at least one feature vector with templates of candidate patterns by computing a distortion measure including distortion measure contributions,
formulating a control signal based on at least one time-dependent variable of the recognition process, and
for said at least one feature vector, computing only a subset of said distortion measure contributions using the vector components of said at least one feature vector, said subset being chosen in accordance with said control signal.

2. A method according to claim 1, wherein said time-dependent variable belongs to the group of processor load and incoming signal properties.

3. A method according to claim 1, wherein the vector components of said at least one feature vector are masked, by applying a mask, thereby reducing the number of computed distortion measure contributions in the subset.

4. A method according to claim 3, wherein said mask is dynamically computed in accordance with said control signal.

5. A method according to claim 3, wherein said mask is selected from a set of predefined masks in accordance with said control signal.

6. A method according to claim 5, wherein said predefined masks represent mutually different reductions of the number of computed distortion measure contributions in the subset.

7. A method according to claim 3, wherein said mask at given time instances comprises all vector components in the feature vector, causing a decimation of the sequence of feature vectors.

8. A method according to claim 1, wherein specific vector components of successive feature vectors are used with a rate depending on their temporal characteristics.

9. A method according to claim 1, wherein said subset of distortion measure contributions is combined with contributions from a previously computed distortion measure.

10. A method according to claim 1, wherein said signal represents speech and the candidate patterns represent spoken utterances.

11. A method according to claim 1, wherein said templates are Gaussian mixture densities of Hidden Markov Models.

12. A method according to claim 11, wherein said distortion measure is based on a log-likelihood.

13. A device for pattern recognition, comprising:
means for forming a sequence of feature vectors from a digitized incoming signal,
a control module adapted to formulate a control signal based on at least one time-dependent variable of the recognition process, and
means for comparing at least one feature vector with templates of candidate patterns by computing a distortion measure comprising distortion measure contributions,
wherein said comparing means are arranged to compute only a subset of the distortion measure contributions, said subset being chosen in accordance with said control signal.

14. A device according to claim 13, wherein said control module is arranged to detect a processor load of the device.

15. A device according to claim 13, further including a masking module, adapted to apply a mask to the components of said at least one feature vector, thereby reducing the number of distortion measure contributions in the subset.

16. A device according to claim 15, wherein said masking module is adapted to select said mask from a set of predefined masks in accordance with said control signal.

17. A device according to claim 15, wherein said masking module is adapted to dynamically compute said mask in accordance with said control signal.

18. A device according to claims 13, implemented as an embedded processing device, comprising
a front-end section for forming said sequence of feature vectors, and a back-end section for providing said set of distortion measures.

19. A speech recognizer including a device according to claim 13.

20. A communication device comprising a speech recognizer according to claim 19.

21. A system for pattern recognition comprising:
means for forming a sequence of feature vectors from a digitized incoming signal,
a control module adapted to formulate a control signal based on at least one time-dependent variable of the recognition process, and
means for comparing at least one feature vector with templates of candidate patterns by computing a distortion measure comprising distortion measure contributions,
wherein said comparing means are arranged to compute only a subset of the distortion measure contributions, said subset being chosen in accordance with said control signal.

22. A computer program product, directly loadable into the memory of a computer, comprising computer program code means for performing, when executed on the computer, the steps of:
forming a sequence of feature vector from a digitized incoming signal, said feature vectors comprising feature vector components,
comparing at least one feature vector with templates of candidate patterns by computing a distortion measure including distortion measure contributions,
formulating a control signal based on at least one time-dependent variable of the recognition process, and
for said at least one feature vector, computing only a subset of said distortion measure contributions using the vector components of said at least one feature vector, said subset being chosen in accordance with said control signal.

23. A computer program product according to claim 22, stored on a computer readable medium.

* * * * *